United States Patent [19]

Makuch

[11] 4,204,306
[45] May 27, 1980

[54] APPARATUS FOR ALIGNING AND TERMINATING AN OPTICAL FIBER WITHIN A FIBER OPTIC CONNECTOR

[75] Inventor: John A. Makuch, Danbury, Conn.

[73] Assignee: Bunker Ramo Corporation, Oak Brook, Ill.

[21] Appl. No.: 849,055

[22] Filed: Nov. 7, 1977

[51] Int. Cl.² ............................................. B25B 27/14
[52] U.S. Cl. .................................................... 29/281.5
[58] Field of Search ............................ 29/281.5, 281.1; 350/96 C; 279/51, 53, 1 Q, 1 DA, 1 FJ; 254/29 A

[56] References Cited

U.S. PATENT DOCUMENTS

| | | | |
|---|---|---|---|
| 2,376,093 | 5/1945 | Shaw | 279/51 |
| 2,955,830 | 10/1960 | Vilter | 279/1 Q |
| 3,041,078 | 6/1962 | Lawall et al. | 279/51 |
| 3,669,462 | 6/1972 | Parsons | 279/1 Q |

FOREIGN PATENT DOCUMENTS 237440  6/1969  U.S.S.R. .................................. 279/1 Q

Primary Examiner—James L. Jones, Jr.
Attorney, Agent, or Firm—F. M. Arbuckle; P. D. Ertel

[57] ABSTRACT

An apparatus for concentrically aligning and terminating an optical fiber within the terminal end of a fiber optic connector includes the use of a resilient jig having a bore dimensioned for receiving the optical fiber. The jig is aligned relative to the connector so that the jig bore is concentric to the outer dimension of the connector terminal end. The resilient jig is uniformly compressed in a chuck to cause the jig bore to contract about an optical fiber threaded through the connector and the jig bore. As a result, the optical fiber is firmly held in concentric alignment to the outer dimension of the connector terminal end for subsequent curing of adhesive material within the connector for terminating the optical fiber to the connector.

14 Claims, 7 Drawing Figures

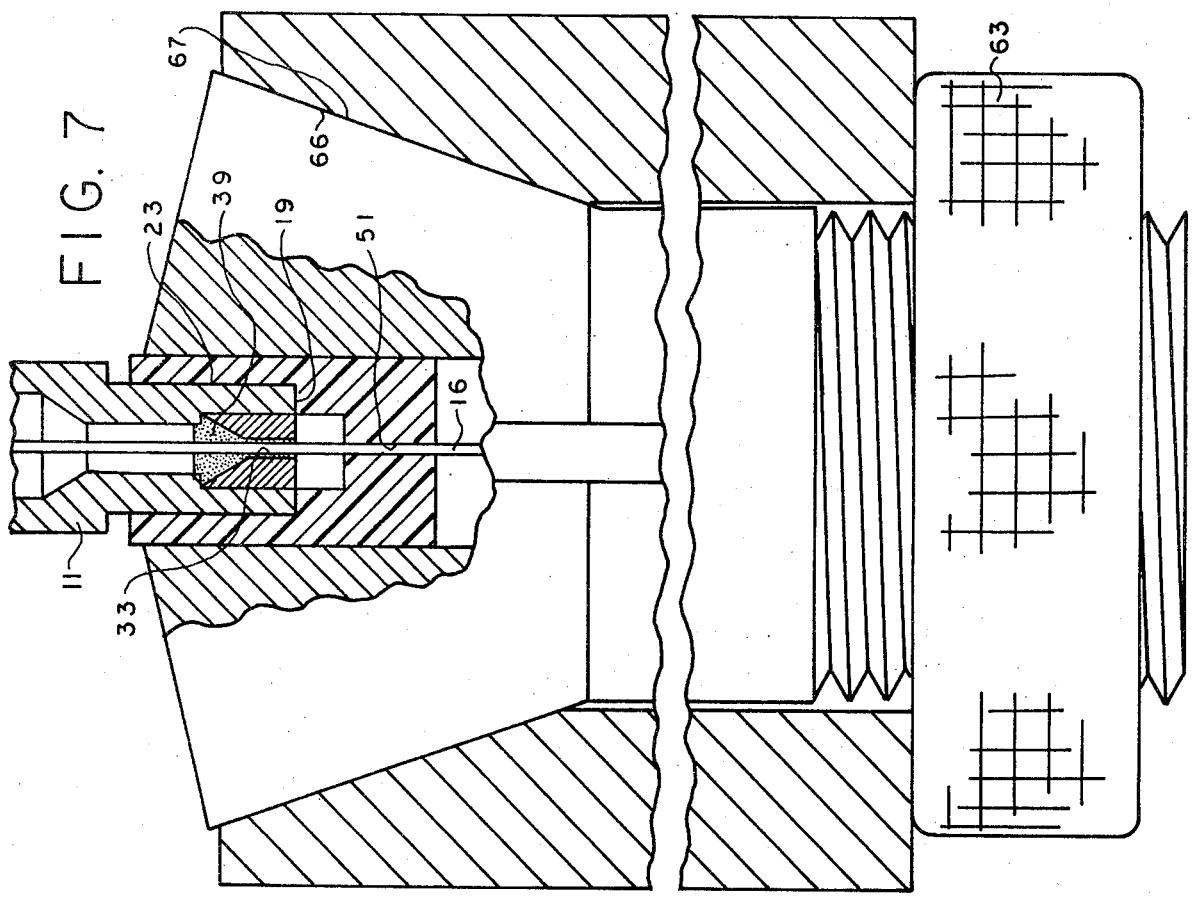
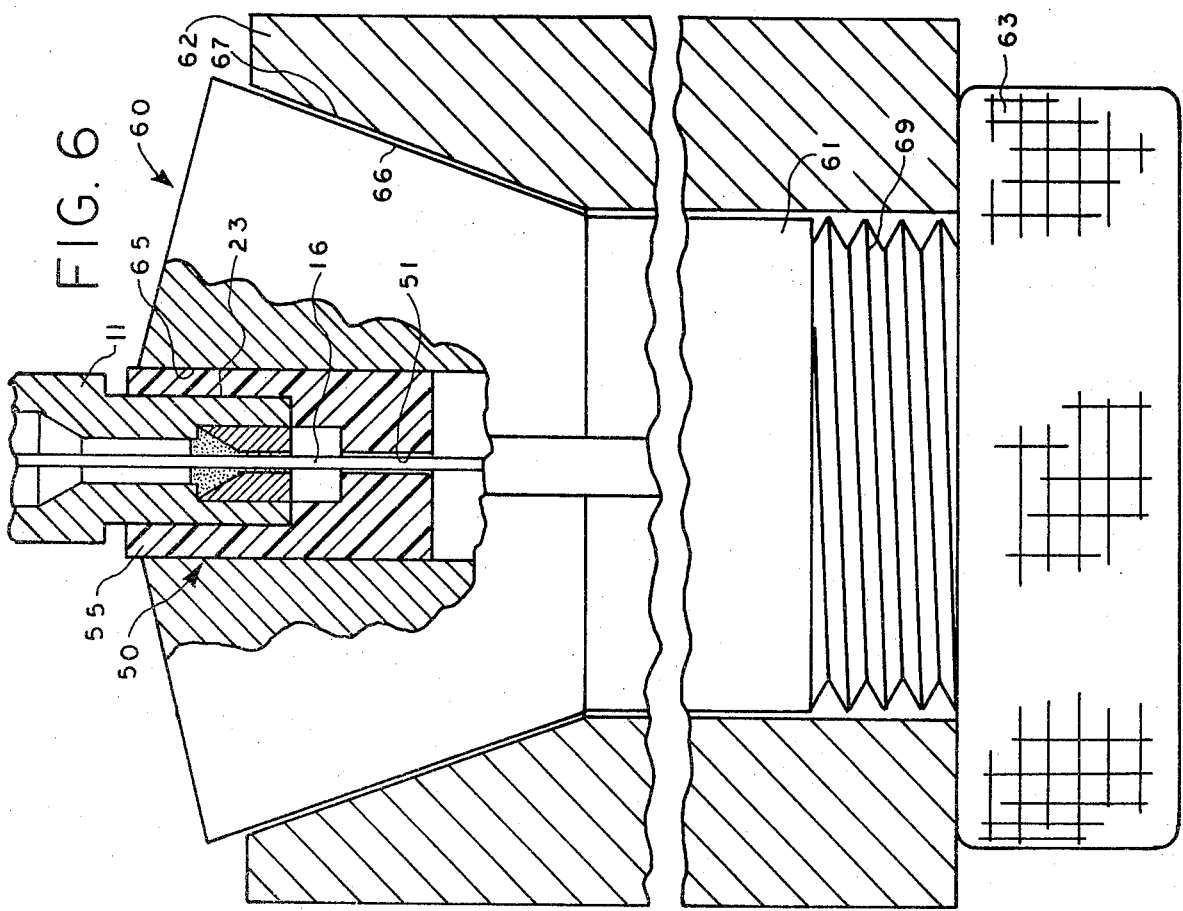

APPARATUS FOR ALIGNING AND TERMINATING AN OPTICAL FIBER WITHIN A FIBER OPTIC CONNECTOR

FIELD OF THE INVENTION

The present invention is generally directed to an apparatus for terminating an optical fiber within the terminal end of a fiber optic connector. The present invention is more particularly directed to an apparatus and method for locating and terminating an optical fiber along a preselected axis within the terminal end of a fiber optic connector wherein the preselected axis may, for example, be concentric to the outer dimension of the connector terminal end.

BACKGROUND OF THE INVENTION

In recent years fiber optic light transmission systems, wherein a single optically conductive fiber or multiplicity of parallel optically-conductive fibers are arranged to form a flexible light-conductive cable bundle for conveying light from one location to another, have come into increasing use, not only for providing illumination, but also for conveying data from one location to another. In the latter application, a light source is modulated with data to be transmitted at one end of the cable bundle, and the data is recovered at the other end of the cable bundle by a photo-sensitive detector. Since the data is conveyed by a medium not subject to radio frequency interference or detection, such light transmission systems are particularly well adapted for high security applications, such as found in the data processing and military communications field.

With the increasing use of fiber optic systems, the need has developed for a connector for optically coupling segments of light-conductive cables with minimum detriment to the optical transmission path. It is generally well known that to achieve efficient light transfer between a pair of fiber optic cables, the optical fibers of the cables must be axially and angularly aligned and as close together as possible without touching. Where the fiber optic cables are used for conveying data, as the data transmission frequency is increased, the diameters of the fiber optic cables must decrease to avoid dispersion and other deleterious effects within the optical transmission path. Data transmission frequencies have increased to the point where only a single optical fiber is utilized for conveying the data. As a result, the absolute magnitude alignment tolerance of the optical fiber ends is extremely small.

It has been found that extremely strict axial and angular alignment between a pair of fiber optic cables can be achieved by terminating the optical fibers of the cables in connector terminating pin assemblies with the optical fibers disposed along a preselected axis within the pins. As a result, when a pair of terminating pins having optical fibers therein disposed along a preselected axis are aligned, the optical fiber terminating ends will also be in close alignment. It has been found that accurate alignment of optical fiber ends may be best achieved when the optical fibers are terminated within the terminal ends of the terminating pins concentrically aligned with respect to the outer dimensions of the terminating pin terminal ends. As a result, when a pair of such terminating pins are concentrically and accurately aligned, the optical fibers will likewise be accurately aligned for efficient light transfer with such alignment also being independent of pin rotation.

Many techniques have been devised for aligning optical fibers concentrically with respect to the outer dimensions of connector terminating pin assemblies. One such technique which has proven successful is fully disclosed and claimed in copending application Ser. No. 806,953, filed June 15, 1977 in the name of the inventor of the present invention, and which is assigned to the assignee of the present invention. The connector disclosed in that application includes a cylindrical terminating pin having a longitudinal bore extending into the rear end of the terminating pin and a counterbore extending into the terminating pin from the terminal end of the pin. The counterbore has inner walls which are concentric with respect to the outer dimension of the cylindrical terminating pin and communicates with the longitudinal bore. A plurality of pin members of equal diameter are within the counterbore and arranged in side-by-side relation for substantial tangential contact with the inner walls of the counterbore and substantial tangential contact with each other. As a result, an optical fiber threaded through the longitudinal bore, the counterbore, and the central passageway defined by the pin members is concentrically aligned within the central passageway defined by the pin members with respect to the outer dimension of the terminating pin.

While the foregoing technique has been found to be commercially successful and provides alignment of the optical fibers for efficient light transfer, the practice of the technique is tedious. Trained personnel are required for placing the pin members within the counterbore because the pin members are extremely small and knowledge of the intended result is necessary. Also, because a plurality of component parts are involved, successful practice of the technique is time-consuming and does not lend itself to mass production techniques.

It is therefore a general object of the present invention to provide a new and improved apparatus for aligning an optical fiber within the terminal end of a connector terminating pin assembly concentrically with respect to the outer dimension of the terminating pin.

It is another object of the present invention to provide an apparatus for aligning an optical fiber within a terminating pin which lends itself to mass production techniques.

It is a still further object of the present invention to provide a new and improved apparatus for terminating an optical fiber within a terminating pin which requires a minimum number of component parts to be utilized and which may be performed by unskilled personnel.

SUMMARY OF THE INVENTION

The invention provides an apparatus for locating an optical fiber along a preselected axis within the terminal end of fiber optic connector comprising jig means formed from cold flowable material having an optical fiber locating portion including a bore dimensioned for receiving the optical fiber, indexing means for aligning the jig means bore with the preselected axis, and force applying means for exerting a uniform compressive pressure to the jig means for causing the cold flowable material to flow about the optical fiber and locate the optical fiber along the preselected axis.

The present invention also provides an apparatus for locating an optical fiber along a preselected axis within the terminal end of fiber optic connector wherein the preselected axis is concentric to the outer dimension of the connector.

The present invention still further provides a method of locating an optical fiber about a preselected axis within the terminal end of fiber optic connector which comprises the steps of providing a jig member formed from cold flowable material having a bore dimensioned for receiving the optical fiber, threading the optical fiber through the connector and through the jig member bore, aligning the jig member with respect to the connector such that the jig bore is concentric to the preselected axis, and applying a uniform compressive pressure to the jig member to cause the cold flowable material to flow about the optical fiber so that the jig bore uniformly contacts about the optical fiber.

The present invention also provides a method of terminating an optical fiber within the bore in the terminal end of a cylindrical terminating pin concentrically with respect to the outer dimension of the terminating pin terminal end wherein the optical fiber is held in the preselected alignment position within the pin during curing of adhesive material within the pin bore for fixing the position of the optical fiber within the terminating pin.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 6 is an exploded, partially cross-sectional view with portions cut away illustrating the relative positions of the terminating pin, resilient jig, and collet chuck during an intermediate step of the method of the present invention; and FIG. 7 is an exploded, partial cross-sectional view, with portions broken away, of the assembly of FIG. 6 after a further step in the method of the present invention has been performed.

DESCRIPTION OF THE PREFERRED EMBODIMENT

Figure 1:
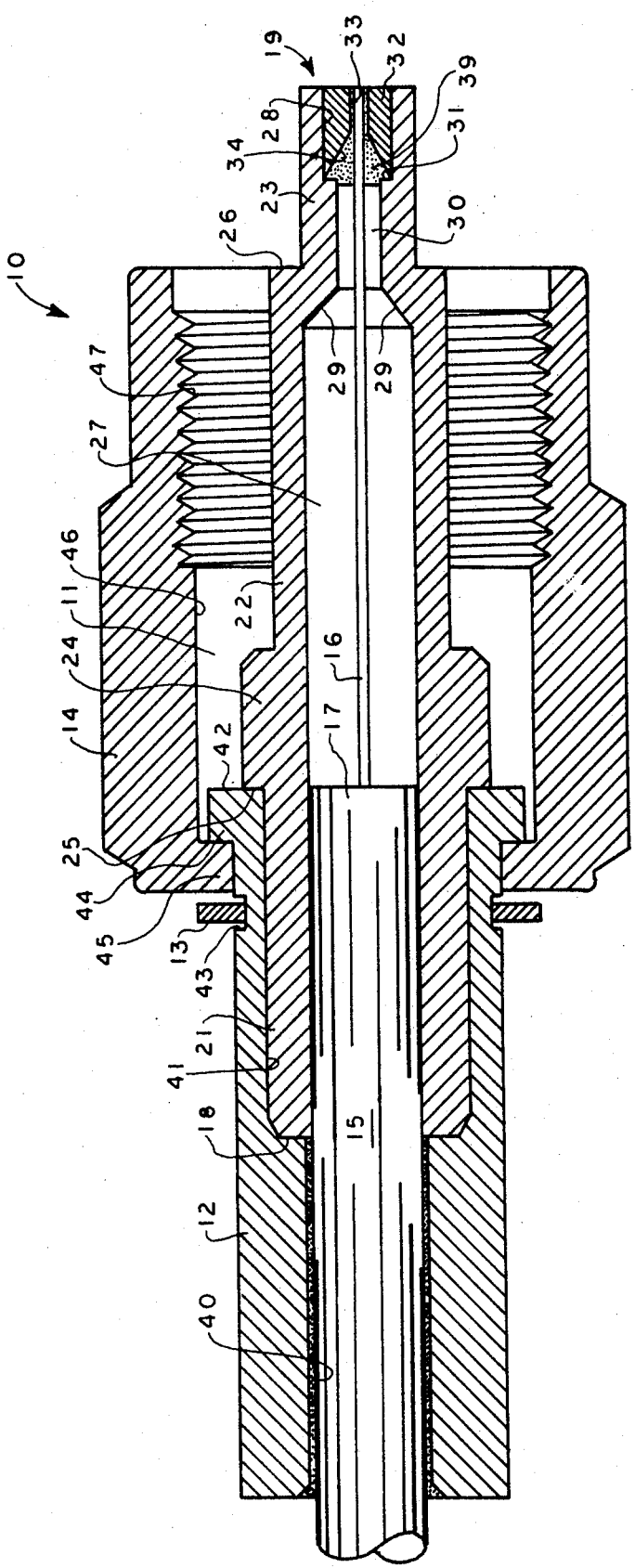
FIG. 1 is a cross-sectional view of a complete fiber optic connector which includes an optical fiber which has been aligned and terminated within a terminating pin in accordance with the present invention.

Referring now to FIG. 1, it shows a complete fiber optic connector which includes an optical fiber which has been aligned and terminated within a terminating pin in accordance with the present invention. The completed connector will be described at this time so that the purpose, objects, and advantages of the inventive apparatus and method may be more greatly appreciated.

The fiber optic connector of FIG. 1, generally designated at 10 includes a terminating pin 11, a rear body portion 12, a retaining ring 13, and a coupling nut 14. The connector 10, as illustrated, terminates a fiber optic cable 15 of the type which includes a single optical fiber 16 which is contained within a coaxial protective jacket or sleeve 17.

The terminating pin 11 is generally cylindrical in shape and comprises a stainless steel tubular body having a rear end 18 and a forward terminal or terminating end 19. The tubular body includes a major diameter portion 21, an intermediate diameter portion 22, and a minor diameter portion 23 at the terminal end 19. Between major diameter portion 21 and intermediate diameter portion 22 is an annular flange 24 which has a rearwardly facing annular shoulder 25. Between the intermediate portion 22 and the minor diameter portion 23 is a forwardly facing shoulder 26 defined by those two portions which adapts the connector 10 for mating interconnection with a complementary connector carrying a like terminating pin structure in a manner as described and claimed in copending patent application Ser. No. 788,820, filed Apr. 19, 1977, in the names of John A. Makuch and Henry R. Fredlund, Jr., which issued on Feb. 20, 1979 as U.S. Pat. No. 4,140,366, and which is assigned to the assignee of the present invention. The connector assembly described therein will be more fully referred to hereinafter.

The terminating pin 11 also includes a longitudinal bore 27 which extends into the rear end 18 of the tubular body and a counterbore 28 which extends into the forward end 19 of the tubular body. Longitudinal bore 27 includes conical sidewalls 29 which converge towards the forward end of terminating pin 11 to a reduced diameter bore 30 which communicates the longitudinal bore with the counterbore 28. The counterbore 28 is greater in diameter than the reduced diameter bore 30 to define a forwardly facing annular shoulder portion 31.

The counterbore 28 is also dimensioned for receiving an insert member 32. The insert member 32 is preferably formed from stainless steel and has an outer diameter corresponding to the diameter of the counterbore 28. The insert member 32 includes a bore 33 which forms the terminal end bore of the terminating pin and which is dimensioned for receiving the optical fiber 16. In actual practice, bore 33 is preferably dimensioned so that the optical fiber 16 will have a small degree of play within the bore. A guide bore 34 having converging sidewalls converging in the direction towards the terminating pin forward end communicates with the bore 33 to assist in the threading of the optical fiber 16 through the terminal end bore 33. The position of the optical fiber 16 within the terminal end bore 33 is fixed by a suitable adhesive such as epoxy 39 within bore 33 and guide bore 34.

The rear body portion 12 of the connector 10 is also tubular and includes a rear bore 40 dimensioned for receiving the fiber optic cable 15, and a forward bore 41 dimensioned for tightly receiving the major diameter portion 21 of terminating pin 11. The rear body portion 12 has a forward annular face 42 which abuts the rearwardly facing shoulder 25 of annular flange 24.

The rear body portion 12 also has an annular slot 43 which is dimensioned for receiving retaining ring 13 to axially fix the retaining ring therein. The retaining ring 13 and an annular flange 44 coact to confine coupling nut 14 on the forward end of the rear body portion 12.

To that end, coupling nut 14 includes a reduced inner diameter portion 45 which is confined between retaining ring 13 and the annular flange 44.

The coupling ring 14 includes a major inner diameter portion 46 which carries suitable inner threads 47 for threadingly mating the connector 10 with a complementary connector. The complementary connector may include an alignment sleeve carried by its terminating pin as fully described and claimed in the aforementioned copending application Ser. No. 788,820, now U.S. Pat. No. 4,140,366. As described and claimed in that patent, the sleeve carried by the mating terminating pin is preferably constructed from resilient material and is dimensioned for tightly receiving the terminal end 19 of the terminating pin 11. The sleeve aligns and spaces the terminating end faces of the fiber optic cables for efficient light transfer. Preferably, the optical fibers are disposed within the terminal ends of their respective terminating pins concentrically aligned with the outer dimension of the terminal ends thereof. With the terminal ends accurately aligned by the sleeve, the terminal ends of the optical fibers will be known to be in accurate alignment also.

From the foregoing, it can be seen that when terminating a fiber optic cable in a terminating pin, it is essential to align the optical fiber within the terminal end bore of the pin along a known and preselected axis, such as a center axis, to effect accurate alignment of mating optical fiber terminal ends. The apparatus embodying the present invention described hereinafter with respect to FIGS. 2 through 7, as will become clear, provides such accurate alignment of an optical fiber within its terminating pin.

Figure 2:
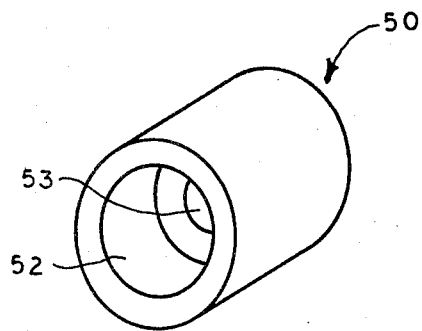
FIG. 2 is a perspective view illustrating the resilient jig portion of the apparatus of the present invention.
Figure 3:
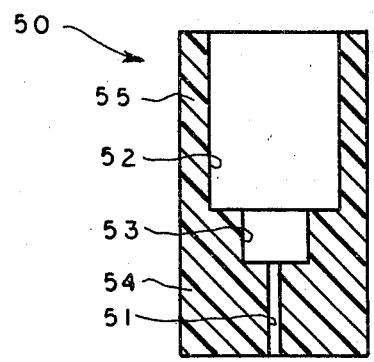
FIG. 3 is a cross-sectional view of the resilient jig of FIG. 2.
Figure 4:
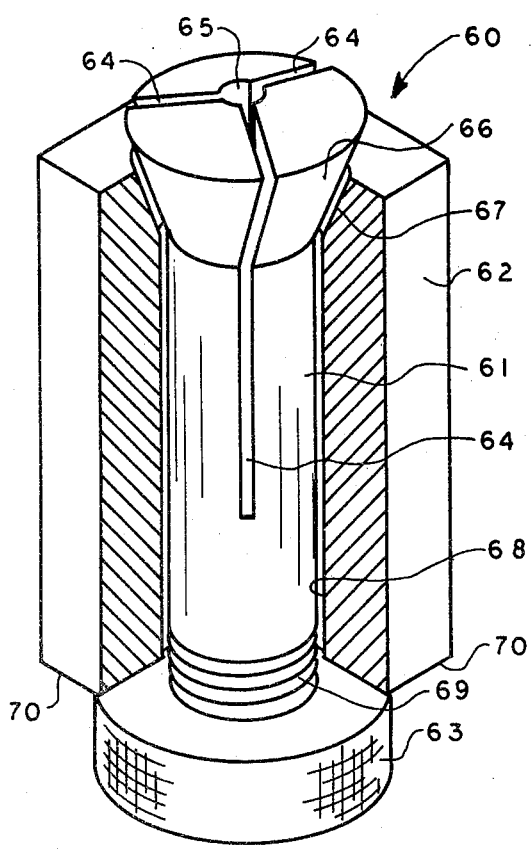
FIG. 4 is a perspective view illustrating the collet chuck portion of the apparatus of the present invention.

The apparatus comprises a jig generally designated at 50 in FIGS. 2 and 3 and a collet chuck generally designated at 60 in FIG. 4. The jig 50 is preferably formed from cold flowable material such as a resilient material. Teflon has been found to be an acceptable material for this purpose. The jig is preferably cylindrical in shape and includes a first bore 51, a first counterbore 52, and a second counterbore 53 which communicates the bore 51 with the first counterbore 52. Bore 52 is dimensioned for tightly receiving the terminal end 19 of the terminating pin 11 (FIG. 1) and therefore has a dimension corresponding to the dimension of the minor diameter portion 23 of the terminating pin 11. Bore 51 is dimensioned for receiving the optical fiber 16 and is concentric with the bore 52. As a result, the lower portion 54 of jig 50 which includes bore 51 serves as an optical fiber locating portion and the upper portion 55 of jig 50 forms an indexing means which aligns bore 51 with a preselected axis within the terminal end bore 33 of the terminating pin 11, such as a central axis, for aligning the optical fiber concentrically with respect to the outer dimension of the terminating pin terminal end 19.

Figure 5:
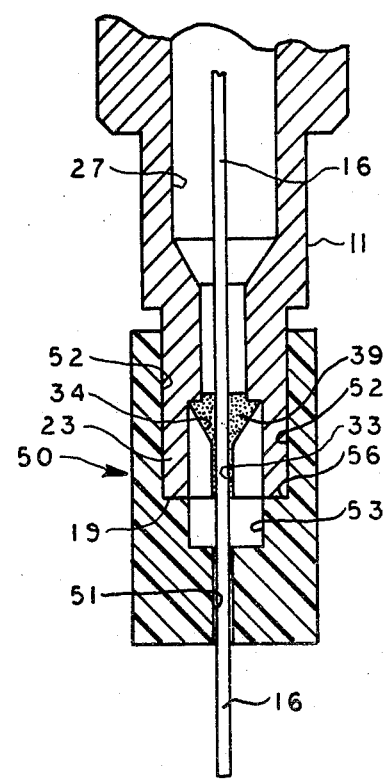
FIG. 5 is a partial cross-sectional view illustrating the relative positions of the terminating pin and resilient jig after the terminal end of the terminating pin is inserted into the resilient jig.

Referring now to FIG. 5, it illustrates the terminating pin and jig after the terminal end 19 of the terminating pin has been inserted into bore 52 of jig 50. Because bore 51 is concentric to bore 52, and because bore 52 is dimensioned for tightly receiving the reduced diameter portion 23 of the terminating pin 11, the optical fiber locating bore 51 will be concentrically aligned with respect to the outer dimension of the terminal end 19 of the terminating pin 11. The first counterbore 52 and second counterbore 53 form a rearwardly facing shoulder 56 which abuts the terminal end 19 of pin 11 to control the distance of travel of terminal end 19 within the jig 50.

Referring now to FIG. 4, it illustrates the collet chuck portion of the apparatus. It comprises an inner cylindrical member 61, an outer member 62, and a threaded member 63. The inner member 61 is generally cylindrical in shape and includes a plurality of axial slots 64 and a central bore 65. The inner member 61 also includes a tapered or conical surface 66 which communictes with a correspondingly tapered or conical surface 67 carried by outer member 62. Outer member 62 also has a bore 68 which is dimensioned for slidingly receiving the inner member 61. Inner member 61 contains a plurality of external threads 69 which mate with the internal threads (not shown) of threaded member 63.

Upon rotation of threaded member 63 on inner member 61, the threaded member 63 acts against the bottom surface 70 of outer member 62 to actuate the members for relative movement. As the inner member 61 moves in the downward direction with respect to outer member 62, the conical surfaces 66 and 67 coact to cause the central aperture 65 to contract.

In practicing the method of the present invention, the optical fiber 16 is threaded through the longitudinal bore 27 and the terminal end bore 33 of the terminating pin 11. Epoxy 39 which is in the uncured state is then caused to flow into the aperture 33 around the optical fiber and into the guide bore 34. The terminating pin 11 is then inserted into the jig 50 in the previously described manner and as the pin 11 is so inserted, the optical fiber 16 is threaded through the bore 51 of jig 50.

After the pin 11 is inserted into the jig 50 as shown in FIG. 5, the jig with the pin 11 therein is inserted into the central bore 65 of the collet chuck with the terminal end of terminating pin 11 pointing downwardly as shown in FIG. 6. As shown in FIG. 6, the bore 51 of jig 50 is located by the indexing portion 55 of the jig so that it is aligned concentrically with the outer dimension of the reduced diameter portion 23 of the terminating pin 11. With the terminating pin 11, the jig 50, and the chuck 60 now arranged as shown in FIG. 6, the threaded member 63 is rotated about the inner member 61 on the external threads 69 to actuate relative movement of the inner member 61 and the outer member 62. As the inner and outer members move with respect to one another, the conical surfaces 66 and 67 will coact to cause the central bore 65 to contract and exert a uniform compressive pressure on the resilient jig 50. The cold flow material of the jig will, in response to the uniformly applied pressure, flow about the optical fiber 16 so that the bore 51 will uniformly contract about the fiber 16 to hold the fiber and locate it along an axis which is concentric to the outer dimension of the minor diameter portion 23 of pin 11.

Rotation of threaded member 63 continues until the bore 51 is in complete and uniform contact with the optical fiber 16 as shown in FIG. 7. The optical fiber 16 is firmly held in position by the contracted bore 51 and is located along the central axis of pin 11 so that it is concentrically aligned with the outer dimension of the minor diameter portion 23 of the terminal end 19 of pin 11. It is important to note that the optical fiber 16 may not be concentrically located within the terminal end bore 33 of pin 11. In fact, it is preferable to dimension bore 33, as previously explained, to allow a limited degree of play for the optical fiber 16 within bore 33 so that it may be aligned concentrically with respect to the outer dimension of the terminal end 19 of the terminating pin 11.

Now that the optical fiber 16 is concentrically aligned within the pin with respect to the outer dimension of the terminal end 19, heat may be applied to the heat curable epoxy 39 for curing the epoxy and fixing the position of the optical fiber 16 within bore 33. Because the terminating pin 11 is formed from stainless steel, the heat may be applied directly to the terminating pin which will in turn conduct the heat to the epoxy 39 or the entire chuck may be placed into a suitable atmosphere at an elevated temperature for heat curing the epoxy.

After the epoxy 39 is cured, the threaded member 63 is then rotated in the reverse direction to cause the central bore 65 to increase in diameter. After the bore 65 releases the jig 50, the jig and terminating pin 11 may be removed from the chuck. Because the jig is formed from resilient material, the bore 51 will expand towards its original dimension releasing the optical fiber 16. Thereafter, the terminating pin 11 may be removed from the jig and the optical fiber external to the forward end of the pin broken off to facilitate grinding and polishing of the terminal end surface 19 of the pin to a smooth surface.

From the foregoing, it can be seen that the present invention provides a new and improved apparatus for locating an optical fiber within a fiber optic connector and which aligns the fiber along a preselected axis, such as a central axis concentric to the outer dimension of the terminal end of the connector. Because there are no small component parts required to achieve the accurate alignment, the method of the present invention is much less tedious than those that have come before. Also, because the relative geometries of the jig and connector are preset, a skilled operator is not required for practicing the present method. As a result, the apparatus and method of the present invention is particularly adapted for terminating optical fibers within fiber optic connectors on a mass produced basis.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An apparatus for locating an optical fiber within an opening in the terminal end of a fiber optic connector along a preselected axis, comprising:
   jig means formed from compressible material, said jig means having an indexing portion including a first opening dimensioned for receiving the terminal end of said connector and an aligning portion including a second opening dimensioned for receiving the optical fiber, said second opening being dimensioned smaller than said first opening; and
   means for applying a uniform compressive force to said jig means, said force applying means causing said indexing portion of said jig means to grip the terminal end of said connector and causing said aligning portion of said jig means to grip the optical fiber, said aligning portion locating the optical fiber along said preselected axis.

2. The apparatus of claim 1 wherein said jig means is formed from cold flowable material.

3. The apparatus of claim 1 wherein said preselected axis is centered relative to the outer surface of the connector terminal end and said second opening is centered relative to said first opening.

4. The apparatus of claim 1 wherein said jig means grips the optical fiber at a point spaced from the terminal end of said connector.

5. The apparatus of claim 1 wherein said jig means is generally cylindrical, said second opening comprises a bore in said jig means, and said first opening comprises a counterbore in said jig means.

6. The apparatus of claim 5 wherein said counterbore is dimensioned to tightly receive the connector terminal end for aligning said bore with the preselected axis.

7. The apparatus of claim 6 wherein said bore is concentric with said counterbore and wherein the preselected axis is concentric with the connector terminal end.

8. The apparatus of claim 6 wherein said jig means includes a second counterbore intermediate said counterbore forming said first opening and said bore forming said second opening, said second counterbore being dimensioned smaller than said first counterbore to define a shoulder portion therebetween, said shoulder portion providing an abutment surface for the connector terminal end to control the distance of travel of the connector terminal end into said jig means.

9. The apparatus of claim 1 wherein said force applying means comprises a collet chuck dimensioned for receiving said jig means and for applying said uniform compressive force in a radially inward direction relative to said jig means.

10. The apparatus of claim 9 wherein said collet chuck comprises an outer member and an axially slotted inner member having a center bore for receiving said jig means, said outer and inner members including cooperating conical surfaces, said collet chuck further comprising means for imparting relative movement of said outer and inner members to cause said conical surfaces to contract said center bore and apply said uniform compressive force in said radially inward direction relative to said jig means.

11. The apparatus of claim 1 wherein said force applying means includes an outer member and an axially slotted inner member having a contractable bore, said force applying means further including bore contracting means associated therewith for uniformly reducing the dimension of said contractable bore.

12. The apparatus of claim 11 wherein said bore contracting means comprises cooperating tapered surfaces carried by said inner and outer members and actuating means for causing said tapered surfaces to reduce the dimension of said contractable bore.

13. The apparatus of claim 12 wherein said actuating means imparts relative movement to said inner and outer members to cause said tapered surfaces to coact for reducing the dimension of said contractable bore.

14. The apparatus of claim 13 wherein said actuating means comprises an external thread carried by said inner member and a threaded member adapted to threadingly engage said external thread and act against said outer member for causing said relative movement of said inner and outer members upon rotation of said threaded member on said external thread carried by said inner member.

* * * * *